Sept. 29, 1959 W. D. GOODALE, JR., ET AL 2,906,823

TELEPHONE PAY STATION

Filed Nov. 13, 1956 3 Sheets-Sheet 1

INVENTORS W. D. GOODALE, JR.
W. PFERD
R. K. THOMPSON, JR.
BY James W. Falk
ATTORNEY Sept. 29, 1959 W. D. GOODALE, JR., ET AL 2,906,823

TELEPHONE PAY STATION

Filed Nov. 13, 1956 3 Sheets-Sheet 2

INVENTORS W. D. GOODALE, JR.
W. PFERD
R. K. THOMPSON, JR.

BY [signature]

ATTORNEY

Sept. 29, 1959 W. D. GOODALE, JR., ET AL 2,906,823

TELEPHONE PAY STATION

Filed Nov. 13, 1956 3 Sheets-Sheet 3

INVENTORS W. D. GOODALE, JR.
W. PFERD
R. K. THOMPSON, JR.
BY [signature]
ATTORNEY United States Patent Office 2,906,823

Patented Sept. 29, 1959

2,906,823

TELEPHONE PAY STATION

Walter D. Goodale, Jr., Chatham, and William Pferd, Berkeley Heights, N.J., and Richard K. Thompson, Jr., Indianapolis, Ind., assignors to Bell Telephone Laboratories, Incorporated, New York, N.Y., a corporation of New York Application November 13, 1956, Serial No. 621,865

8 Claims. (Cl. 179—6.3)

This invention relates to telephone pay stations and more particularly to telephone pay stations employing coin collector circuits.

In present day dial telephone systems there are three types of calls which may be originated by the user of a telephone pay station; these are, local calls, multi-unit calls, and toll calls. A local call requires the deposit of an initial or minimum rate and enables the customer, after deposit of the initial rate, to complete a call to any subscriber within the local area by dialing the called party's directory number. Local calls do not require the assistance of an operator. Multi-unit calls are those calls requiring more units of deposit than that required for local calls and enable the customer, after such deposit, to complete a call to any subscriber within the area encompassed by the rate deposited by dialing the called party's directory number. With telephone pay stations now in general use, a multi-unit call requires operator monitoring of the deposit and upon verification of sufficient deposit, the call is completed. The third type of call, a toll call, requires operator assistance to establish the connection with the called party as well as to supervise the deposit, and covers all areas outside of those served by multi-unit calls. It will, therefore, be observed that with present day telephone pay stations all calls except local calls require the assistance of an operator to monitor the deposit.

Telephone pay stations generally known in the art today are equipped with coin collector circuits which implement the establishment of the above-described types of calls by performing several specific functions. Among these are the refund and collection of deposits, informing the central office of the amount of deposit, and preventing the use of the telephone services until the correct deposit has been made. Many of these functions require the assistance of a telephone operator.

An object of the present invention is the provision of a telephone pay station requiring less assistance and monitoring by telephone operators in the establishment of calls.

In present day telephone systems, a central office is signaled when a telephone pay station desires service by the completion of a path to ground from one of the line conductors, either ring or tip, upon deposit of the initial rate. This ground path completes a circuit through a line relay at the central office which in turn connects a dialing circuit to that particular pay station. This initial deposit control is accomplished in a manner well known in the art through the use of latches inserted into the coin chutes, so arranged that a particular minimum amount of deposit must be made before the coins will pass further down the chutes to activate a switch, known as the hopper trigger. It is the actuation of this hopper trigger that completes the necessary path to ground. Such a system of latches is disclosed, for example, in Patent 2,179,091 issued to F. A. Hoyt et al. on November 7, 1939.

Another object of the present invention is the provision of a telephone pay station wherein the assurance of sufficient initial deposits is derived in a more dependable fashion.

A difficulty heretofore experienced with the above-described initial deposit control arrangement is that unscrupulous parties may fraudulently obtain telephone service from a telephone pay station by falsely grounding the line conductors thereby signaling the central office that the initial deposit has been made. This difficulty has been alleviated in the prior art telephone systems by a fraud-prevention arrangement wherein the dial pulsing contacts of telephone pay stations are bridged or shorted until the correct deposit has been made. In this way, the dial is disabled until the initial deposit is made, and even though one of the line conductors is fraudulently grounded and the central office connects a dialing circuit, the defrauding party will be unable to make a call due to the disablement of the dial. In prior art telephone pay stations this fraud-prevention arrangement is operationally linked to the above-described initial deposit control arrangement so that the short circuit path bridging the dial pulsing contacts is maintained until the initial deposit has been made, at which time the short circuit is removed and the dial is enabled.

An additional object of the present invention is the provision of a telephone pay station containing improved fraud-prevention means.

Experience has shown that constantly changing economic conditions require adjustments in the rate schedules of telephone companies. These changing rate schedules often include changes in the amount of initial deposit for local calls from telephone pay stations and may include changes in the amount of deposit necessary for multi-unit calls. The initial deposit control arrangement employing latches described above is a relatively static or inflexible arrangement. Heretofore, changes in rate schedules requiring an adjustment of the initial deposit control arrangement have necessitated a redesign and replacement of the latches utilized in this arrangement and, in some cases due to insufficient physical room or other design problems, an entirely new telephone pay station housing has been required. Furthermore, changes in rate schedules also necessitate the modification of the fraud-prevention arrangements in telephone pay stations presently in use.

Another object of the present invention is the provision of an improved telephone pay station wherein changes and adjustments required by revisions in rate schedules are facilitated.

As indicated hereinbefore, an operator must monitor all multi-unit and toll calls originated from telephone pay stations currently in use in order to verify that the correct amount of money has been deposited for these calls. This verification is accomplished through the use of gongs and chimes located in the telephone pay stations. These gongs and chimes are struck by the deposited coins, and the particular gong or chime struck depends upon the denomination of the coin. Such a system of central office apprisal of the deposit necessitates immediate transmittal of the audible deposit tones since there is no practical way of storing the tone of a gong or chime. Therefore, the operator must monitor the deposit of each coin, necessitating the supervision of each call beyond the local range from the time of initiation until sufficient deposit is made to pay for the service requested. With the current expansion of direct dialing facilities, more calls are coming within the multi-unit type of service and less are being made as toll calls. This results in a diminution of the operator's functions on many calls. On calls for which formerly an operator had to both complete the connection and verify the deposit, the operator must now only verify the deposit. It will be advantageous to have this verification operation performed as rapidly as possible, thus permitting the operator to serve more customers within any given time.

Still another object of the present invention is the provision of a telephone pay station facilitating more efficient and dependable deposit verification.

An additional object of the present invention is the provision of a telephone pay station wherein the total amount of money deposited for any call may be ascertained upon demand and with greater rapidity.

It is well known that the trend of the telephone industry is toward complete automation. The attainment of this objective necessitates a system of automatic deposit verification so that all calls from telephone pay stations may be handled as multi-unit calls and without any operator assistance whatever. The wide variation in tone frequency and tone strength transmitted by the present gong and chime arrangement does not lend itself to the use of automatic deposit verification equipment in the central office. For an automatic deposit verification system to be practical, an efficient and reliable source of deposit information capable of being automatically controlled and supervised by central office equipment must be incorporated in telephone pay stations.

A further object of the present invention is the provision of a telephone pay station wherein the total amount of money deposited for any call may be automatically verified from a remote location.

As mentioned above, the telephone industry is currently attempting to extend its facilities for multi-unit calls and at the same time provide more automatic handling of these calls. During a conversion of this nature, it is necessary that telephone service be conducted without interruption. To facilitate this conversion program telephone pay stations are needed which will operate under two conditions; one, the arrangement currently in use wherein operators verify deposits, and the other, wherein deposits are automatically verified by equipment at the central office.

An additional object of the present invention is the provision of a telephone pay station facilitating automatic deposit verification which is compatible with present day operator supervised deposit verification operations and procedures.

The present invention is, therefore, an improved telephone pay station wherein the aforementioned objects are attained.

In order to provide the deposit control flexibility necessitated by changing rate schedules, it has been found that several avenues of approach to the problem are possible. One of these is disclosed in a copending application of W. D. Goodale and W. Pferd, Serial No. 591,116, filed June 13, 1956, in which the deposit controls are adjusted to handle changed rates by rotationally reorienting control cams which are mounted on the shaft of a totalizing device. This same arrangement is illustrated in Fig. 1 of the attached drawings and as hereinafter discussed, may be utilized in combination with the deposit registering and signaling apparatus of the present invention. Another approach which contains advantageous features is the complete replacement of the control device. When a rate change takes effect, it is frequently necessary to change the initial deposit control, the overtime deposit control, and the fraud-prevention means. The present invention provides a common control device to control each of these functions and by making the device easily installed and easily detached from the coin collector a very efficient means of rate adjustment is provided.

A feature of the present invention relates to the provision in the coin collector of a telephone pay station of a common deposit control means which may be conveniently replaced to provide for changes in rate schedules.

On multi-unit calls, it is advantageous to read out the deposit information from a telephone pay station as rapidly as possible thereby permitting the central office readout equipment or the operator to serve more calls. If the central office must wait for the deposit of each coin and read out the deposit information upon each such deposit, considerable time is consumed. By the use of a coin totalizer such as the type disclosed in the copending application of W. Pferd, Serial No. 518,017, filed June 27, 1955, it is possible to totalize the value of all the coins deposited without transmitting any information to the central office. In this way, upon demand of the central office, only the pertinent information, the total deposit, need be transmitted. This eliminates the waste of valuable time and equipment while waiting for a customer to fumble for change which is a necessity when transient signaling means for transmitting information upon deposit of each coin are used. The task of adding up such single deposits with the attendant possibilities of error is also eliminated. The speed with which the actual deposit information is transmitted to the central office is also an important factor in increasing the economical use of operator or equipment time, because the longer the deposit evaluation process takes, the fewer calls a particular operator or unit of central office equipment may handle. It has been found that an advantageous way of decreasing this deposit transmission time is that of encoding the deposit information in some fashion. By choosing a code in which the information increments are few, the desired goal is attained. A binary code is found to fulfill these requirements.

Another feature of the present invention relates to the provision in the coin collector of a telephone pay station of a coding means which registers the amount of deposit in a binary code.

A further feature of the present invention relates to the provision in a telephone pay station of a coin collector capable of transmitting, upon central office demand, a plurality of frequencies representative in a binary code of the total amount of deposit.

In a telephone pay station the coin collector is the link between the telephone company and the prospective customer. It is therefore imperative that it record and transmit all monetary deposits efficiently, accurately, and as already mentioned, in as short a time as possible. It is quite obvious that the operator or the automatic equipment at the central office can only be as accurate and as rapid as the pay station coin collector deposit signaling means permits. When the deposit signaling apparatus in a coin collector is adapted to transmit the total deposit information upon central office demand, for maximum reliability it is best to keep the full information stored until it has been entirely transmitted to the central office, rather than permit it to be gradually destroyed as the information is being transmitted.

A still further feature of the present invention relates to the provision in a telephone pay station of a deposit registering means which stores the total deposit information until all of the deposit signaling is completed.

The need for a telephone pay station which is capable of operation either with operator supervision of deposits or with automatic deposit evaluation equipment has been hereinbefore discussed. Of prime importance in meeting such a need is the provision of a deposit signaling means that is capable of interpretation by either an operator or automatic equipment. This means that if tones are used they must be within the audible range and they must also be sufficiently distinctive frequency-wise to permit detection by automatic deposit evaluation equipment. It is further worthy of note that an additional reason for keeping such a frequency signaling means within the audio range is that this is the range for which telephone equipment is designed to be most sensitive.

Another feature of this invention relates to the provision in a telephone pay station of deposit signaling means capable of both aural and automatic detection.

Present day coin collectors, in use in telephone pay stations, generally employ separate means of deposit control and deposit evaluation. In well-known telephone pay stations, for instance, it is common to perform the functions of initial and overtime deposit control by means of latches and gates, while deposit evaluation is performed by an operator upon receipt of signals generated mechanically by gongs and chimes. When deposit signaling means are used which on multi-unit calls transmit information concerning only the total deposit, and which must be reset following use, it is advantageous to perform the deposit control and deposit evaluation operations with a single or common means. This simplifies pay station construction and provides a more reliable coin collector.

According to one aspect of the present invention a telephone pay station is provided containing a coin collector with a common means for deposit control and evaluation.

Until such time as toll calls are eliminated by the rapidly expanding multi-unit type of call, there will be areas where automatic multizone equipment will not be available and for this reason, it is necessary to provide a transient signaling system for informing the operator of the denomination of each coin of a plurality of coins deposited in telephone pay stations. In a system of this nature the signals representing each coin are transmitted immediately upon each deposit. The gongs and chimes used in present day telephone pay stations are an example of such a transient signaling means.

Another feature of this invention relates to the provision in a telephone pay station of a more reliable transient signaling means for selectively transmitting a plurality of frequencies to the central office indicative of the denomination of deposited coins and capable of interpretation by either an operator or automatic equipment.

Both during and following the use of a telephone pay station it is necessary to place the pay station deposit control and evaluation equipment in a normal condition preparatory to reuse by a subscriber. This necessity may arise during a multi-unit call when in preparation for recording the necessary deposit the initial amount may be refunded; when following the elapse of time allotted for a local call, the initial deposit is collected and an additional amount is required to continue the conversation; or when following the read-out of the deposit registering equipment it is necessary to reset the equipment in order to record any further deposits made by a customer. It is also imperative that the deposit control equipment be reset to a normal or ready-to-use condition upon completion of a call in order to provide an operative pay station for the next customer. The conditions requiring reset of deposit control equipment may be divided into two categories, reset during calls and reset following termination of calls, either local or multi-unit. By utilizing common equipment for deposit control and deposit evaluation, it becomes possible to use a common reset device. In effect the reset means in this invention performs two operations at once, reset of deposit control equipment and reset of deposit evaluation equipment. Further, to insure reliability, the advantages of alternate means for resetting this equipment are clear, and such means are provided.

Another feature of the present invention relates to the provision in a coin collector of a telephone pay station of common means for simultaneously resetting the deposit control and deposit evaluation equipment during either local or multi-unit calls and means for resetting the deposit control and deposit evaluation equipment upon termination of calls.

Still another feature of the present invention relates to the provision in the coin collector of a telephone pay station of alternate means for resetting the deposit control and deposit evaluation equipment.

The foregoing, as well as additional objects and features, will be more clearly understood and appreciated from the description below considered in connection with the drawing, wherein.

Figures 1, 2, 3, 4:
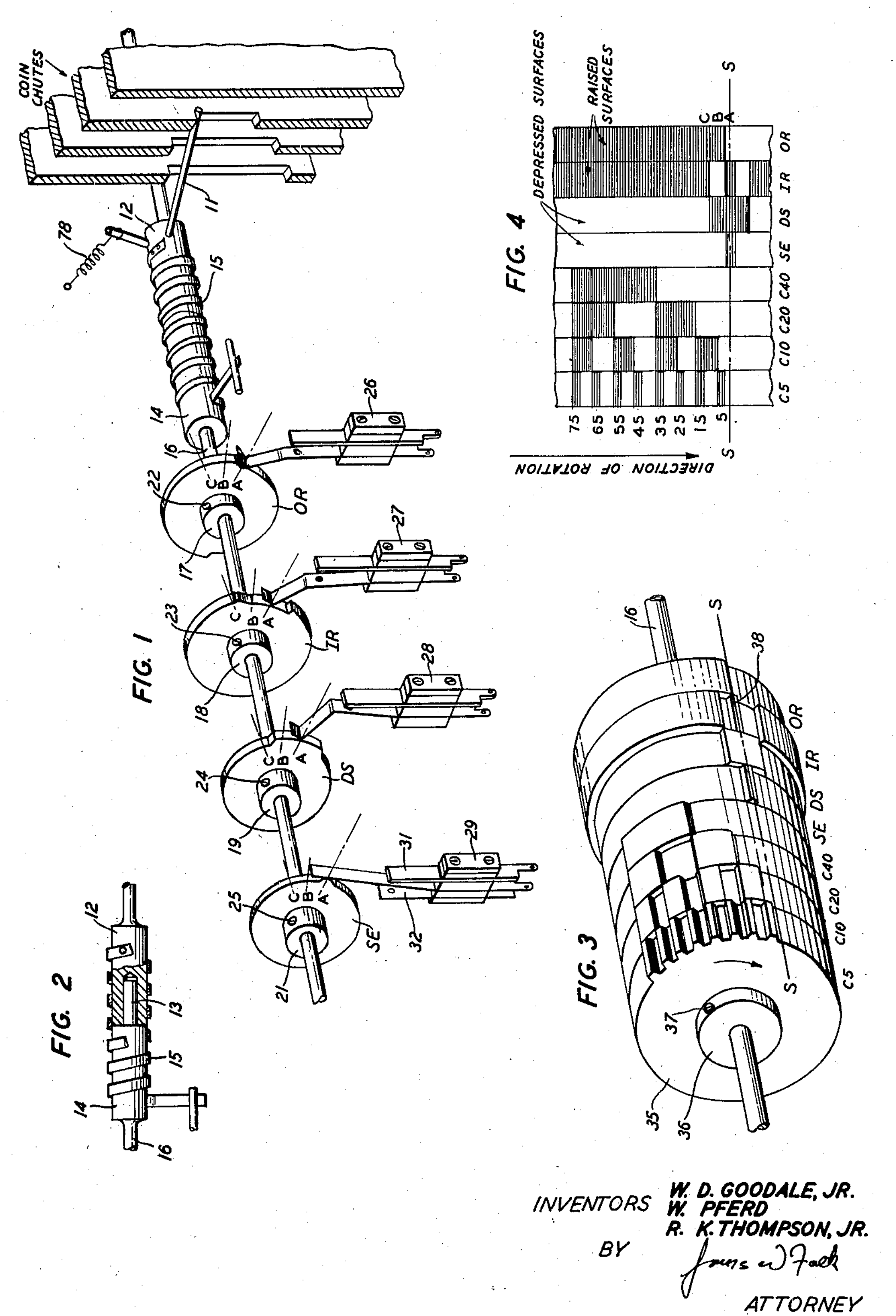
Fig. 1 is a perspective view of a coin totalizing mechanism and associated control devices used for overtime deposit control, initial deposit control, fraud prevention, and enabling of deposit signaling circuitry.
Fig. 2 is a view of the coin totalizer band clutch mechanism which couples the coin finger control shaft and sleeve combination.
Fig. 3 is a perspective view of a control drum capable of registering four elements of a binary code, and containing four control channels for initial and overtime deposits, fraud prevention, and deposit signal enabling.
Fig. 4 is a developed view of the control drum illustrated in Fig. 3.
Figure 8:
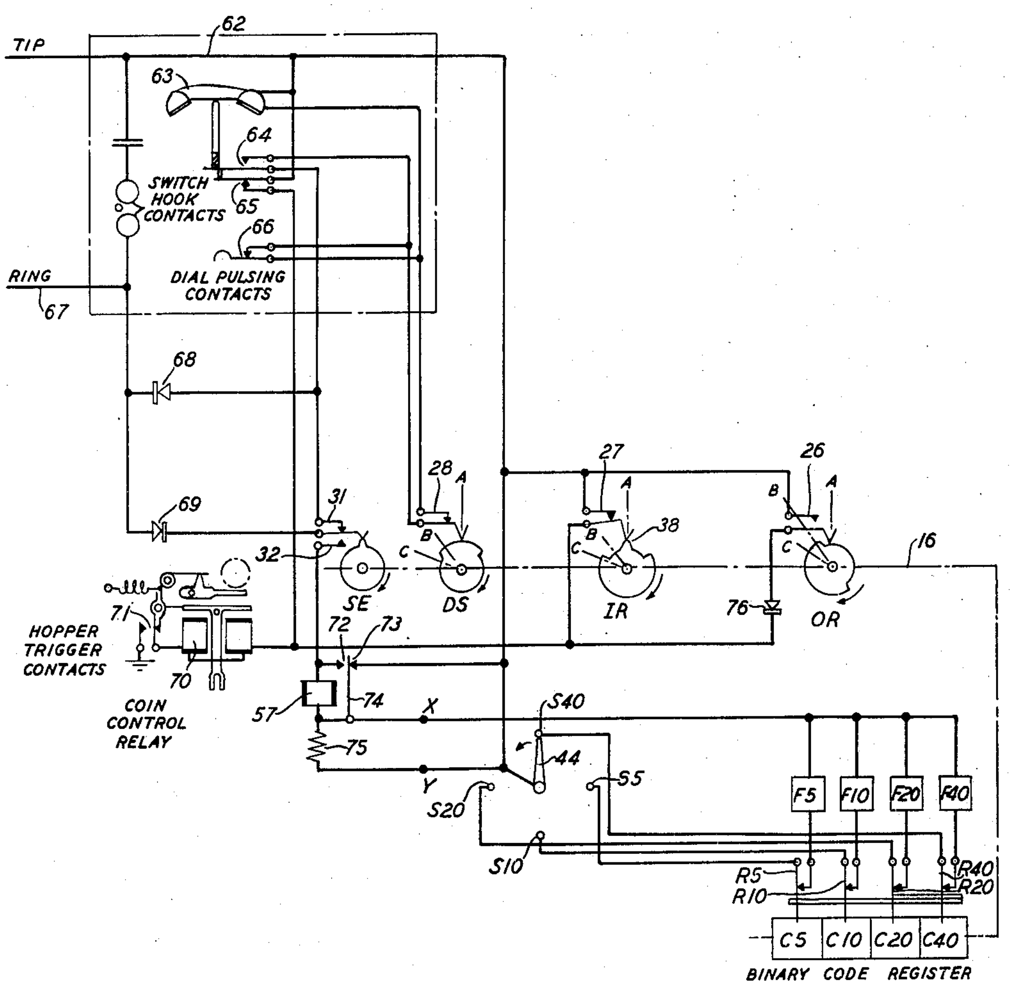
Fig. 8 shows a circuit schematic of a telephone pay station employing an illustrative embodiment of the invention.

Referring to the drawings, Figs. 1 through 7 show the structures employed in the coin collector of the present invention. Fig. 8 relates to an illustrative embodiment in which the structure is utilized. Figs. 1 and 2 show a coin totalizing mechanism with associated deposit control cams and a signal enabling cam. This structure has been disclosed in a copending application of Goodale and Pferd, Serial No. 591,116, filed June 13, 1956. The coin totalizer comprises coin finger 11 secured to and projecting from sleeve member 12 and is provided with a coaxial bore into which a reduced section 13 of shaft or cylinder 14 fits. Shaft 16 is a reduced section of cylinder 14 extending in the direction away from the clutch mechanism. The elements 12 and 14 constitute two cylinders which have a common axis of rotation and are torsionally coupled by the friction between the two and coil spring 15 fitted over the cylinders. Cylinder 12, to which coin finger 11 is secured in any suitable manner, is regarded as the driving cylinder and cylinder 14 as the driven cylinder. It is well known that as driving cylinder 12 is rotated in such a direction as to wind up spring 15 and decrease its diameter, the spring will grip the cylinder and exert more torque than it will when the direction of rotation is such as to tend to unwind the spring. Thus when the driving cylinder 12 is rotated in a clockwise direction, spring 15 is wound in a direction tending to decrease its diameter, with the result that a substantial coupling torque is produced and driven cylinder 14 follows the clockwise rotation of cylinder 12. When driving cylinder 12 is rotated counterclockwise under the influence of spring 78, the coupling torque is substantially lessened and cylinder 14 does not tend to follow cylinder 12 under this condition. For a more complete description of the totalizing portion of this unit, reference may be made to the copending application of W. Pferd, Serial No. 518,070, filed June 27, 1955.

Adjustably mounted on shaft 16 and located to the left of cylinder 14 are four contact controlling cams OR, IR, DS, and SE. These cams are provided with shoulders 17, 18, 19, and 21, respectively, to accommodate set screws 22, 23, 24, and 25, respectively, which permit rotational adjustment of the cams relative to the shaft to be made. Spring pileups 26, 27, 28, and 29 are rigidly located with respect to the controlling cams so that the movable springs thereof are acted upon by the surfaces of the controlling cams as the cams are rotated. Each of these cams may be employed to perform a specific function in an embodiment of this invention.

The deposit of a coin in the appropriate coin chute rotates coin finger 11 through an angle proportional to the denomination of the coin deposited in the manner described in the above-cited W. Pferd application. This imparts rotation to shaft 16 which is proportional to the denomination of the deposited coin. As more coins are deposited, shaft 16 rotates further in a clockwise direction and the amount of rotation at any given time is proportional to the total amount of deposit up to that time. It is apparent that the cams will, as deposits are made, act upon the spring contacts at certain degrees of rotation or certain amounts of deposit and that the amount of deposit at which the cams do act may be changed by loosening the set screws and adjusting the cams rotationally upon the shaft so that the arc through which they must be rotated to impart such action is either enlarged or decreased. Such adjustments may be made to each cam independently or to all cams. The ability to make these adjustments provides one method of obtaining a flexible deposit control.

In Fig. 1 three rotational positions, A, B, and C, are shown at which the coin totalizer and hence the control cams may reside after deposit of a particular amount. Position A indicates the original or no-deposit position; position B indicates the existing position when an amount sufficient to pay the local overtime charge is deposited; and position C indicates the existing position when an amount sufficient to pay the initial charge is deposited. As the coin totalizer and control cams are rotated, the contacting surfaces of the cams act upon their associated spring contacts causing them to either make or break at predetermined amounts of rotation, thereby performing control functions at specific amounts of deposit.

The three control cams OR, IR, and DS may be used in the illustrative embodiment to provide deposit control and cam SE may be used for enabling the deposit signaling equipment. Cam DS is rotationally located upon the shaft 16 so that upon deposit of the initial charge, that amount necessary to make a local call, it permits spring contact 28 to open. As is evident in the circuit schematic shown in Fig. 8, the opening of this contact removes the short circuit across the dial pulsing contacts and providing the central office has connected a dialing circuit, a customer may dial the desired directory number. Cam IR is rotationally located upon the shaft 16 so that upon deposit of the initial charge, it will close contact 27. This contact closure is utilized in the illustrative embodiment shown in Fig. 8 to provide a path from the tip conductor to ground through hopper trigger contacts 71, which may be used to inform the central office that a telephone pay station is requesting service. Cam OR is rotationally located upon shaft 16 so that upon deposit of the amount necessary to pay the overtime charge it will close contact 26. Reference to the illustrative embodiment shows that this contact closure establishes a circuit for unidirectional current between the tip conductor and ground via hopper trigger contacts 71. The existence of such a circuit provides the central office with a means of ascertaining when the charge for overtime conversation on local calls has been deposited. Cam SE is rotationally located upon shaft 16 so that whenever a deposit is made, contact pair 31 opens and contact pair 32 closes, thereby providing an indication that a deposit has been made.

Fig. 3 shows a cylinder or drum which will be referred to as the control drum. This drum contains four channels or segments to encode and register the amount of deposit and four channels or cam segments to perform the operations discussed above in connection with the control cams of Fig. 1. In fact, one way of fabricating the portion of the control drum consisting of the cam segments is conceivably by welding together cams such as those shown in Fig. 1 after the shoulders used to accommodate the securing set screws have been removed. Except for one case the cam segments may correspond exactly in function and surface shape to the four control cams hereinbefore discussed. This special case concerns cam and cam segment IR. It will be noted, when Fig. 3 is considered, that cam segment IR contains projection 38 at the zero deposit position. This projection is utilized in the illustrative embodiment to close contacts providing a path from tip conductor to ground when the totalizing mechanism is in the zero deposit position. The need for such a path will be made clear later when the operation of the illustrative embodiment is discussed. Provision of such a contact closing projection in the mechanism of Fig. 1 would require an additional cam or its equivalent if the requirement of rate change flexibility is to be met. The control cams of Fig. 1 depend entirely upon their ability to be reoriented about the totalizer shaft for their rate change flexibility and therefore a projection on control cam IR would not be feasible. When a replaceable control drum is employed, however, the flexibility arises from the ease of replacement and therefore addition of projection 38 is quite economical. It is appreciated that the actual shape of the cam sections may be varied without in any way departing from the spirit of the invention. It is also possible to employ fewer cam sections and somewhat more involved spring contact pileups to perform the same operations as those performed here by four cam sections. The chosen cam structure is used herein to provide a simple and easily understood illustrative embodiment of the invention. It should be well understood that the illustrative embodiment of the invention may employ either arrangement for deposit control and signal enabling. The figures depicting the control drum all show eight channels differentiated as above, but if it is desired to employ the control cams of Fig. 1, the drum may easily be constructed to serve as a deposit encoding and registering device only. To further emphasize this, the cam segments and control cams are indicated by the same notations, OR, IR, etc.

The four channels to the left in Fig. 3 compose what is known as the binary code register. Although only four channels are illustrated, it does not depart from the spirit of the invention to add more than this, thereby providing registering means for larger amounts of deposit. From the following discussion it will be apparent that the total amount of deposit the illustrated register can accommodate is seventy-five cents. The addition of a fifth channel would permit total registration of all amounts up to one dollar and fifty-five cents. The surface of the register is divided up by a particular configuration of projections and depressions. As is clear, each succeeding channel contains projections and depressions of twice the length of the preceding one forming a pattern indicative of a binary code. This pattern may be better explained in connection with Fig. 4 which is a developed view of the surface of a similar control drum. For purposes of convenience and of understanding, henceforth it will be assumed that an angle of five degrees of rotation is imparted to the totalizing mechanism and therefore the control drum by every five-cent coin deposited. The numerals on the left side of Fig. 4 serve to calibrate the register in monetary increments and the letters A, B, and C, on the right side correspond to those previously discussed and relate respectively to the no deposit, overtime deposit, and initial deposit positions. In the register the first channel, C5, that representative of the first binary digit, characterizes the number of five-cent increments in the total deposit. The second channel, C10, that representative of the second binary digit, characterizes the number of ten-cent increments in the total deposit, and the third and fourth channels, C20 and C40, characterize respectively the twenty and fourty-cent increments existing in the total deposit. Using four channels for deposit registration, it is therefore possible to register deposits up to and including seventy-five cents in value in five-cent increments.

Establishing a stationary line or position SS parallel to the axis of the drum and located directly above the normal no-deposit position of the drum, and recalling that the rotation of the drum is proportional to the amount of deposit, it will be clear that upon deposit of coins, for instance fifteen cents, the drum will rotate in a clockwise direction bringing the projections of channels C5 and C10 directly under the stationary position SS, whereas the depressions of channels C20 and C40 will be under the stationary position. By placing normally closed contacts such as the ones illustrated in Fig. 5, which is a side view of the apparatus associated with channel C5 with the feeler of the lower contact located along position SS, it is possible by forcing the lower contact down against the register to determine whether a projection or depression exists in a given channel at that degree of rotation. If a projection exists, the contacts will remain closed. If a depression exists, the contacts will open. In this invention a frequency source is connected in series with the contacts positioned over each channel. Hence, by determining whether or not a complete circuit exists, it is possible to read out the position of the register as indicated by the binary code imprinted upon the face.

Figures 5, 6, 7:
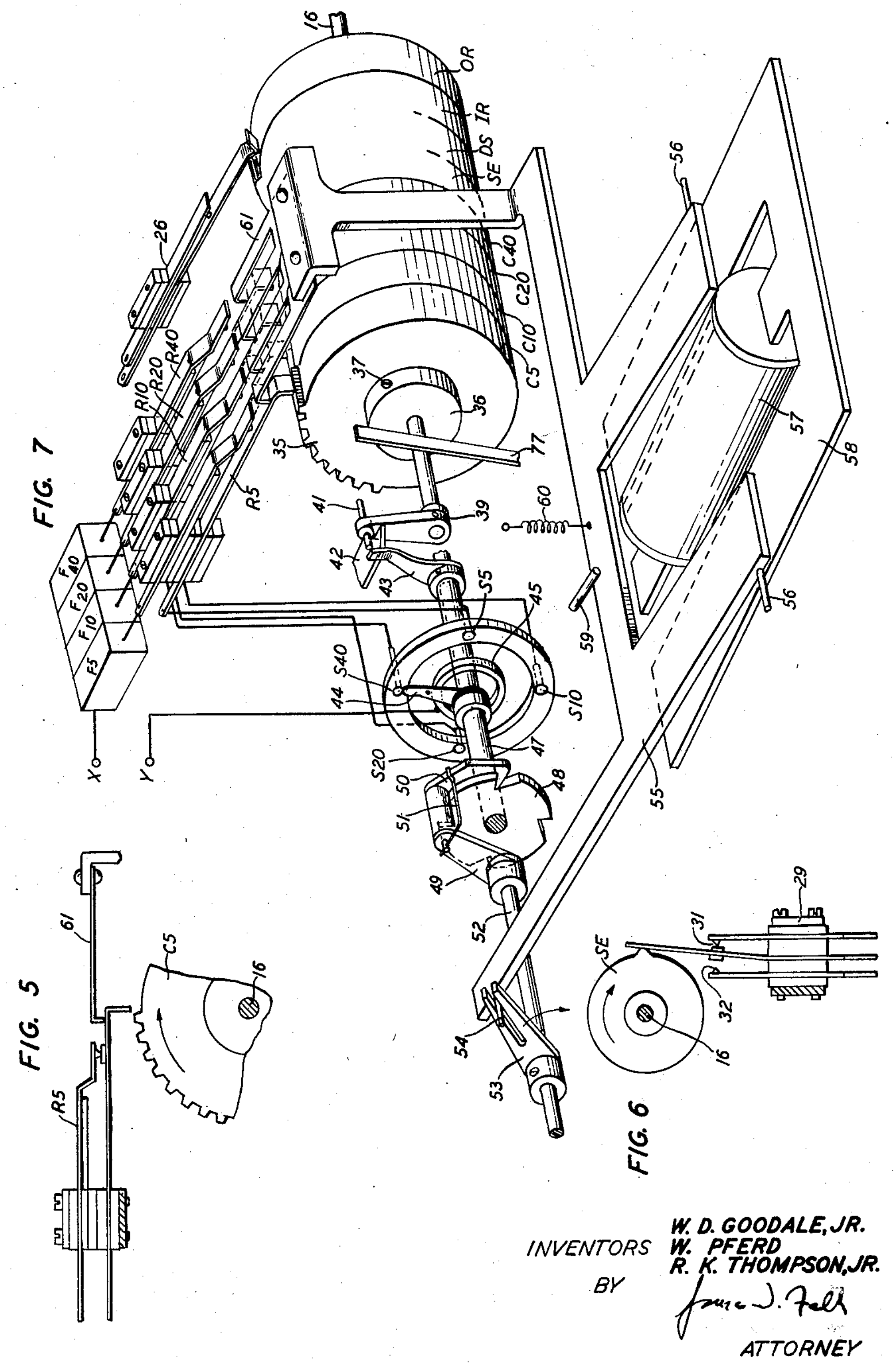
Fig. 5 is an illustrative view of a signal control contact showing its position with respect to the surface of a binary code register.
Fig. 6 is an illustrative view of a deposit control contact showing its position with respect to a deposit control cam segment.
Fig. 7 is a perspective view of the deposit signaling mechanism employed in this invention.

The structure of the deposit signaling means is illustrated in Fig. 7. This figure may be considered to be made up of five functional parts. The first part consists of a plurality of frequency sources F5, F10, F20, and F40, and provides one distinct frequency for each channel of the binary code register. The second part, the signal encoding and selecting part, consists of a plurality of normally closed contacts R5, R10, R20, and R40, the lower contacting members of which are poised over each channel of the binary code register. The third part provides the deposit and signal enabling control and is depicted by a representative channel OR, with its associated spring contacts 26. This part operates in exactly the same manner as discussed above in relation to the control cams of Fig. 1. Control drum 35, a vital element in both of the latter two functional parts, will be observed to be securely fastened to shaft 16 by means of set screw 37 passing through shoulder 36. The fourth portion of this figure, the signal sequencing portion, comprises selecting wiper 44; sequencing contacts S40, S20, S10, and S5; and notched disk 48. The other members of the structure may be considered as making up the fifth portion, the control portion. Specifically, these members are electromagnet 57, E shaped core 58, armature 55, depressing springs 61, and slotted member 53.

In the coin collector of this invention, the structure of Fig. 7 is mounted to the left of the coin totalizer band clutch mechanism of Fig. 1, and the control cams may be eliminated; or, limiting the control drum to only the four channels of the binary code register we may retain the control cams and add an additional pair of contacts to replace projection 38 on channel IR of the drum. The sequence of operation of the deposit signaling mechanism as coins are deposited is as discussed below. It may be helpful to note first that in Fig. 7 there are three independent shafts; shaft 16 upon which the control drum is securely fastened; shaft 47 upon which notched disk 48, selecting wiper 44, and spring reset 43 are fastened; and shaft 52 upon which slotted member 53 and member 49 are mounted.

When coins are deposited in the coin slots, as hereinbefore discussed, shaft 16 is rotated a number of degrees proportional to the amount of deposit. Control drum 35, being securely fastened, rotates a like number of degrees. The position of the binary code register now indicates in binary code form the amount of money deposited. In order to utilize this stored information, electromagnet 57 is energized. This magnet is arranged to operate in a self-stepping manner when a D.C. voltage is applied across its control circuit as will be more fully discussed in relation to the illustrative embodiment depicted in Fig. 8. Energization of electromagnet 57 produces a magnetic flux in E shaped core 58 which attracts armature 55 causing it to move in a downward direction about pins 56. Depressing springs 61, which are attached to the right-hand side of armature 55 as viewed in the figure, force the lower contacts of the plurality of reading contacts against the surface of the binary code register. For illustrative purposes, let us assume that thirty-five cents have been deposited. This being the case, channels C5, C10, and C20 will have projections underneath the feelers of their respective reading contacts while channel C40 still has a depression. This is clearly depicted in the thirty-five cent position in Fig. 4. Contacts R5, R10, and R20 therefore remain closed, whereas contacts R40 are opened. Considering the sequencing mechanism, it will be noted that line Y is connected to slip ring 45 which in turn always makes electrical contact with selecting wiper 44. Contacts S40, S20, S10, and S5 are rotationally mounted about the axis of shaft 47 and electrically connected to one side of contacts R40, R20, R10, and R5 respectively. At this point in the operation of the deposit signaling mechanism, therefore, no path exists between points X and Y because contacts R40 are opened. The depression of armature 55 simutaneously results in rotating shaft 52 ninety degrees in a clockwise direction. This rotation results from the action of pin 54 mounted upon the left-hand extension of armature 55 and engaged in the slot of member 53. The resultant clockwise rotation of shaft 52 rotates member 49 and attached member 50 ninety degrees in a clockwise direction and under the action of spring 51; member 50 engages the next notch in a clockwise direction about notched disk 48. In accordance with the conventional operation of a stepping magnet, after a short period of time the magnet releases permitting armature 55 to return upward under the action of spring 60 until stopped by stop 59. This returning action causes shaft 52 to reverse its rotation and turn counterclockwise for ninety degrees carrying with it member 49 and its attachments. The tooth of member 50 being securely engaged in a notch of notched disk 48, the disk 48 is turned ninety degrees counterclockwise. Being securely fastened to disc 48, shaft 47 also moves, carrying with it selecting wiper 44 until it makes contact with S20. A path now exists between points X and Y in which are included frequency source F20, reading contacts R20, sequencing contact S20, selecting wiper 44, and slip ring 45. This sequence of events continues with electromagnet 57 stepping selecting wiper 44 one complete turn counterclockwise until its returns to its original position in contact with S40. During the final step between S5 and S40, spring member 43 engages pin 41 protruding from member 39, carrying it back to a no-deposit position. Upon approach to this position, stationary member 42 forces spring member 43 out of contact with pin 41 permitting it to continue in a counterclockwise direction when further deposit signaling operations are performed. A review will indicate that each channel of the binary code register has now been read and the frequency sources representative of the channels in which projections were present under the contacts have been connected to points X and Y. It will be further noted that signals representing first the forty-cent channel, next the twenty-cent channel, next the ten-cent channel, and finally the five-cent channel have been considered for transmission to the central office in that order. In order to read out the information stored on the four channels of the binary code register, the selecting mechanism, as described above, made four ninety-degree steps. If more channels are used in the binary code register in order to obtain greater registering capacity the selecting mechanism would be designed to make a number of steps equal to the number of channels. For instance, if five channels were used, the selecting mechanism would make five seventy-two degree steps thereby making possible transmission of five different frequencies to the central office.

In addition to the totalizer reset means discussed in the previous paragraph, there is another means of reset provided in this invention. Coin control relays having an armature and vane arrangement for deposit handling are well known in the art and are utilized to collect and refund deposited coins. Such a relay is used in this invention, and member 77 is an extension of the armature of this relay. Proper orientation of the coin control relay makes possible the movement from right to left of armature extension 77, as viewed in Figs. 7, whenever the relay is operated to either refund or collect deposited coins. During such movement, armature extension 77 bears against pin 41 and thereby forces the entire totalizing mechanism in a counterclockwise or reset direction. This counterclockwise travel is halted when member 39 is forced against stationary member 42 at the no-deposit position of the totalizing mechanism. Upon deenergization of the coin control relay, armature extension 77 returns to a position sufficiently clear of the rotating mechanism to permit unhampered operation during totalizing, registering, and deposit signaling.

Before continuing with a description of the operation of the illustrative embodiment of this invention, one more structural feature is worthy of note. Located at the bottom of the coin chutes and an integral part of the coin relay is a hopper trigger. This trigger, illustrated in the circuit schematic of Fig. 8, is merely a finger projecting into the coin chute which is deflected or tripped when the first coin is deposited. When deflected, the hopper trigger closes a pair of contacts which appear in the illustrative embodiment schematic as contacts 71. These contacts remain closed until the coin relay is operated to either refund or collect the deposit, at which time the hopper trigger is reset and they immediately reopen.

Considering Fig. 8, it will be noted that the circuit includes the four cam sections, the operation of which was hereinbefore discussed, and a symbolic representation of the binary code register with its associated control elements. Cam section DS acts upon spring contact 28 which serves as a means of shorting out the dial pulsing contacts 66 until a predetermined minimum amount of deposit is made. Cam section IR acts upon spring contacts 27, keeping them closed until a deposit is made and serves as an initial deposit control by closing contacts 27 as soon as sufficient initial deposit is made. Cam section OR acts upon spring contact 26 closing it when the amount necessary for continuing a local call into overtime is deposited. Cam section SE is the deposit signaling enabling control and enables the deposit signaling circuit whenever coins are deposited by closing contact 32. In the upper left portion of Fig. 8, the telephone set is illustrated, represented by a handset 63, switchhook contacts 64, 65 that operate upon removal of the handset, and dial pulsing contacts 66 which transmit information relating to the proposed destination of a call in the well-known manner. The manner in which reset electromagnet 57 operates upon the coin totalizer mechanism is shown in Fig. 7 and was described above. Rectifiers 68 and 69 provide a means of isolating the telephone circuitry from the deposit apprisal circuitry. Hopper trigger contact 71 is of the type described above and closes upon deposit of the first coin to be reopened only by operation of the coin relay 70. This coin relay may be any of the well-known types containing an armature and vane arrangement for coin disposal that operate to collect the deposit when a positive voltage is applied and refund the deposit when a negative voltage is applied. Rectifier 76 is in the overtime charge control circuit and permits current to flow through this circuit between the tip conductor and ground only when the tip conductor is positive with respect to ground.

The three rotational positions indicated in Fig. 8 are the same as those discussed above in connection with the coin totalizing structure in Fig. 1. Here too, the deposit of coins is assumed to rotate the cams in a clockwise direction.

In order to properly consider the operation of the circuit shown in Fig. 8, let it be assumed that the initial rate charge is ten cents and that the charge for a local call is the same; also, that the additional deposit necessary to continue a local call into overtime is five cents. Deposit of a five-cent coin will, therefore, rotate the totalizer to position B and deposit of two five-cent coins or one ten-cent coin will rotate it to position C.

To initiate a call, the customer removes handset 63 from its cradle thereby opening switchhook contact 65 and closing switchhook contact 64. The initial charge is then deposited, rotating the control drum to position C. If two five-cent coins are used, the first will rotate the totalizer to position B, and as it proceeds down its chute, operate the hopper trigger closing hopper trigger contacts 71, and the second will rotate the totalizer to position C. In this position, cam section IR closes contact 27 and a path from the tip conductor 62 to ground is established through contacts 27, coin relay 70, and hopper trigger contact 71. In a manner well known to the art, a low negative D.C. voltage source at the central office utilizes this path to energize a line relay which in turn connects a dialing circuit to the loop, indicated at the pay station by the presence of a dial tone. In position C, the dial pulsing contacts 66 are no longer shorted by contacts 28; therefore, the customer may dial the directory number of the party with whom he desires to make a connection.

If the call is abandoned before dialing, or before the called party answers, hang-up of the handset 63 causes switchhook contact 64 to open and then switchhook contact 65 to close. When switchhook contact 64 opens, the line loop composed of ring conductor 67, rectifier 68, switchhook contact 64, dial pulsing contacts 66, handset 63, and tip conductor 62 is opened. This causes the release of the loop supervisory relay at the central office and, in the well-known manner, the central office applies a negative refund battery between the tip conductor and ground. This negative voltage, which is of higher potential than that used by the central office during initiation of calls, energizes coin control relay 70 via a path which may be traced from tip conductor 62 through contact 27, and hopper trigger contact 71 to ground, thereby refunding the deposit. As previously discussed, any operation of the coin control relay results in resetting the hopper trigger contacts to an open condition, and also due to the extension of the coin control relay armature member 77, shown in Fig. 7, such operation resets the totalizer to a no-deposit position. The telephone pay station is now ready to be reused and the customer who did not complete his call has had his money refunded.

Under usual circumstances, if the call is to a party within the local area, the connection to the called party will be made automatically and the desired conversation will ensue. Should the call be terminated within the time allotted for local calls, replacement of the handset and the subsequent opening of switchhook contact 64 will release the loop supervisory relay at the central office and in the well-known manner, the central office will apply a positive coin battery between the tip conductor and ground. This voltage will cause the operation of coin control relay 70 to collect the deposit and reset the totalizer to position A, and upon release, reset the hopper trigger contacts making the telephone pay station ready for reuse.

Not infrequently, the time provided for a local call is not sufficient for the needs of a customer and the call proceeds into overtime. For the purposes of this discussion, let it be assumed that the time allotted for local calls is five minutes. At the end of four and one-half minutes, the central office momentarily opens the talking connection and positive coin battery is applied between tip conductor and ground, collecting the deposit, resetting the totalizer, and reopening hopper trigger contacts 71. Through experience, when a telephone pay station user hears the collection of the deposit as the coins drop into the collection box, he knows his calling time is up. In lieu of this knowledge, the small information bulletins posted in telephone booths will furnish information as to the procedure he should follow. Deposit of an additional amount will permit further conversation, and if this deposit is made, the call will continue uninterrupted. After five minutes has elapsed, the central office will apply a low positive D.C. voltage between the tip conductor and ground, and if a complete path is in existence the central office knows that the overtime deposit has been made. If the correct overtime deposit is present, shaft 16 will rotate the control drum to position B and a path from tip conductor to ground will exist which includes contact 26, rectifier 76, coin relay 70, and hopper trigger 71. At the conclusion of the overtime period this deposit will be collected and the same procedure will be followed. Thus, a local overtime call may proceed as long as the customer wishes to make the additional deposits and no operator intervention is required.

Before commencing with a discussion of the procedures and operations involved in handling multi-unit and toll calls, let us first consider the circuitry connected with electromagnet 57 which renders it a self-stepping device whenever a constant D.C. voltage is applied across itt windings. By the addition of armature 74 and contact pairs 72 and 73, the winding of the magnet is shorted after it has built up sufficient magnetic strength to attract armature 74 and therefore close contact pair 72. Naturally, this results in the deenergization of magnet 57 and consequently, the release of armature 74. Upon release, the armature returns to its normal position closing contact pair 73 and opening contact pair 72 so that the energization circuit is again enabled. In the well-known fashion, this cycle of operation will continue until there is no longer an applied voltage. Resistor 75, as shown in Fig. 8, is connected to reset magnet 57 and provides a circuit between ring conductor 67 and tip conductor 62 when electromagnet 57 is shorted. Resistor 75 provides the voltage necessary to energize the plurality of signal oscillators, F5, F10, F20, and F40, and thereby place a tone on the line during the shorted phase of the electromagnet's stepping cycle. These oscillators may be of the transistor type and are enrgized by the same D.C. voltage which operates the reset magnet. During the period the magnetic winding is shorted the oscillators transmit a tone which is terminated upon return of armature 74 to the normal position shown in Fig. 8. Hence, an audible tone is transmitted for each step of the magnet and, as previously mentioned, each step rotates the sequencing selector wiper 44 to connect the oscillator representative of a different binary digit to points X and Y. Upon transmittal of all stored deposit information the totalizer is reset, closing contact pair 31 and opening contact pair 32. This disconnects the deposit signaling circuit. Audible frequencies are used and the interval between the pulses is chosen to provide for easy interpretation of the signals either by an operator or automatic equipment.

When a customer at a telephone pay station incorporating the embodiment of the invention shown in Fig. 8 wishes to make a multi-unit call, he will first ascertain the correct amount of deposit for a call to the area in question. If this is not known from past experience, a rate schedule may be consulted. Telephone pay stations which are known to handle a large number of multi-unit calls, such as those located at air and rail terminals, frequently post such rate schedules in a prominent place. Under normal conditions the entire cost of the call may be deposited immediately, the directory number of the called party dialed, and the call established without any operator contact with the customer. When the deposits are made the customer will hear the dial tone as soon as he has deposited an amount equivalent to the initial rate charge. This indicates that the dial is enabled and the central office has recognized the particular pay station as wishing to place a call. Although a circuit now exists through which a local call may be arranged, if the customer dials a directory number outside of the local range an operator will intervene and the increased time necessitated by human supervision of calls will result. Posted instructions indicate that the complete deposit should be made for multi-unit calls before dialing. When the correct deposit is made before the called party's directory number is dialed, an operator or automatic equipment at the central office will investigate the number and determine the amount of deposit necessary for the service requested. Naturally, the control drum has been rotated to some position beyond position C since the multi-unit total deposit is greater than the deposit required for a local call.

After the required deposit is made, contact 27 is closed indicating a request for service, and in the well-known manner, the central office connects a dialing circuit to the line. Since contact 28 is open, the dial is enabled and the customer proceeds to dial the directory number of the party with whom it is wished to establish a connection. Upon receipt of the number, the central office determines, what the deposit should be and then applies a positive D.C. voltage to the ring conductor. At the pay station, this voltage back biases rectifier 68 and forward biases rectifier 69. Due to the position of cam section SE, contact 32 is closed and the positive voltage therefore finds a current path from ring to tip conductor through rectifier 69, contacts 32 and electromagnet 57. This positive voltage supplies the necessary energy to induce the automatic stepping action of electromagnet 57 as discussed above. During each operate time of electromagnet 57, contact 73 opens and contact 72 closes. The ensuing voltage developed across resistor 75 results in the transmittal to the central office of the plurality of frequencies indicative of the amount of deposit. If the deposit information conveyed by the signals corresponds to the charge for the multi-unit call requested, the call is permitted to proceed. If an inadequate deposit is indicated, personal operator supervision is required.

When multi-unit calls are made, the coin totalizing and registering mechanism is reset to a no-deposite position during the early phases of the call. This being true, a circuit for refunding or collection of deposit must be available when the mechanism is in such a position. This circuit is provided through contact 27 closed by projection 38 on cam section IR.

The provision of the transient deposit signals that are necessary for the toll calls made to areas beyond those served by multi-unit equipment requires no additional elements when this illustrative embodiment is used. When a telephone pay station user wishes to call such an area, the well-known procedure of depositing the initial charge, dialing the operator or the directory number of the party called, informing the operator of the destination of the call, and then finally receiving instructions as to the necessary deposit will still be employed. From a customer's point of view, there is no need to change any of the operations involved in placing a toll call. However, using this illustrative embodiment, a more reliable form of deposit apprisal is available for the central office. After informing the customer of the necessary amount of deposit, the operator applies a positive D.C. voltage to the loop and, as each coin is deposited, the self-stepping electromagnet arrangement and deposit signaling equipment transmit frequencies indicative of the denomination of the coin deposited. Thus, this illustrative embodiment replaces the well-known gongs and chimes with a more effective transient signaling means.

It is to be understood that the detailed description above is merely an illustrative embodiment of the invention and it is not intended to limit the invention to this illustrative embodiment. Other arrangements may be devised by those skilled in the art without departing from the spirit and scope of this invention.

What is claimed is:

1. In a telephone pay station connected by a line to a central office, totalizing means including a shaft rotatable in response to the deposit of coins, the degree of rotation of said shaft being proportional to the amount of deposit, a code drum having a plurality of code elements mounted upon said shaft, a source of a plurality of signals the frequency of each of said signals characterizing a different code element on said code drum, means operative in response to a signal from said central office and controlled by said code drum for selectively connecting said plurality of signals to said line, and reset means for resetting said code drum to an initial position.

2. In a telephone pay station connected by a line to a central office, totalizing means including a shaft rotatable in response to the deposit of coins, the degree of rotation of said shaft being proportional to the amount of deposit, a code register comprising a drum member adjustably mounted on said shaft and adapted to rotate therewith, said drum member having a plurality of projections and depressions representative of a binary code, sensing means responsive to a signal from said central office for sensing the projections and depressions on said drum member to determine in binary code the degree of rotation of said shaft, a pluraliy of signal sources energized by a potential condition placed on said line by said central office, each of said sources producing a signal having a frequency distinctively characterizing a different element of said binary code, and means operative in response to said potential condition and controlled by said sensing means for selectively connecting said signal sources to said line.

3. A telephone pay station in accordance with claim 2 wherein said last-mentioned means includes a plurality of contacts, each of said contacts being connected to a signal source, wiper means, and self-stepping relay means for causing said wiper means to connect to each of said contacts in sequence.

4. In a telephone pay station connected by a line to a central office, a binary code register, said register comprising a plurality of adjacent sections, each of said sections representative of an element of a binary code and comprising a member having a series of alternate projections and depressions of equal length on the surface thereof, the length of said projections and depressions on each successive member as the code elements are considered in order of ascending magnitude being equal to twice the length of the projections and depressions on the preceding member, a plurality of signal sources energized by a potential condition on said line, each having a frequency distinctively characterizing a different section of said binary code register, control means responsive to said potential condition, individual enabling means for each of said signal sources controlled by said control means and a distinct section of said register, means controlled by said control means for sequentially connecting the enabled signal sources to said line, and means actuated by said control means following the connection of all enabled signal sources to said line for resetting said binary code register to an initial position.

5. A telephone pay station connected by a line to a central office comprising in combination, a calling dial, totalizing means including a shaft rotatable in response to the deposit of coins, the degree of rotation of said shaft being proportional to the amount of deposit, a control drum adjustably mounted upon said shaft and adapted to rotate therewith, a first plurality of sections on said control drum composing a binary code register for encoding the amount of deposit, a plurality of signal sources controlled by said register, each signal produced by said plurality of signal sources characterizing a different code element in said register, means operative in response to a signal from said central office and controlled by said register for selectively connecting said signal sources to said line, a second plurality of sections on said control drum, first control means actuated by a first section of said second plurality of sections at a predetermined degree of rotation to enable said dial to transmit signals, second control means actuated by a second section of said second plurality of sections at a predetermined degree of rotation for applying a potential condition on said line to apprise said central office that a predetermined amount has been deposited, third control means actuated by a third section of said second plurality of sections at a predetermined additional degree of rotation for applying a potential condition on said line to apprise said central office that a predetermined additional amount has been deposited, and fourth control means actuated by a fourth section of said second plurality of sections upon deposit of the first coin to permit transmission from said plurality of signal sources.

6. A telephone pay station connected by a line to a central office comprising in combination, a calling dial, totalizing means including a shaft rotatable in response to the deposit of coins, the degree of rotation of said shaft being proportional to the amount of deposit, a binary code register mounted upon said shaft and adapted to rotate therewith, a plurality of signal sources controlled by said register, each signal produced by said plurality of signal sources characterizing a different code element in said register, means operative in response to a signal from said central office and controlled by said register for selectively connecting said signal sources to said line, four rotatable means mounted upon said shaft and adapted to rotate therewith, first control means actuated by a first of said rotatable means at a predetermined degree of rotation to enable said dial to transmit signals, second control means actuated by a second of said rotatable means at a predetermined degree of rotation for applying a potential condition on said line to apprise said central office that a predetermined amount has been deposited, third control means actuated by a third of said rotatable means at a predetermined additional degree of rotation for applying a potential condition on said line to apprise said central office that a predetermined additional amount has been deposited, and fourth control means actuated by a fourth of said rotatable means upon deposit of a coin to permit transmission from said plurality of signal sources.

7. In a telephone pay station connected to a central office by a line having two conductors, totalizing means including a shaft rotatable in response to the deposit of coins, the degree of rotation of said shaft being proportional to the amount of deposit, a control drum adjustably mounted upon said shaft and adapted to rotate therewith, a first plurality of sections on said control drum comprising a binary code register for encoding the amount of deposit, a second plurality of sections on said control drum comprising deposit control means, coin disposal means operable in response to a signal condition on one of said conductors for collecting deposited coins and to a different signal condition on said conductor for refunding deposited coins, reset means when actuated for resetting said control drum to an initial position, means operated in response to a signal on the other of said conductors for actuating said reset means, and means controlled by said coin disposal means when operated for actuating said reset means.

8. In a telephone pay station connected by a line to a central office, totalizing means operative in response to the deposit of coins to integrate the amount of deposit, a code register having a plurality of code elements representative of the amount of deposit controlled by said totalizing means, a source of a plurality of signals each having a frequency differing from that of each other signal, the frequency of each of said signals characterizing an individual one of said code elements on said code register, means operative in response to a signal from said central office and controlled by said code register for selectively connecting said plurality of signals to said line, and reset means for resetting said control register to an initial position.

References Cited in the file of this patent

UNITED STATES PATENTS

| | | |
|---|---|---|
| 1,121,739 | Lundquist | Dec. 22, 1915 |
| 2,000,804 | Wehren | May 17, 1935 |
| 2,306,654 | Triman | Dec. 29, 1942 |
| 2,345,167 | Willis | Mar. 28, 1944 |